US008228490B2

(12) United States Patent
Richards

(10) Patent No.: US 8,228,490 B2
(45) Date of Patent: Jul. 24, 2012

(54) SYSTEM AND METHOD FOR PRECISE MEASUREMENT OF DEFLECTION

(75) Inventor: Chet L. Richards, Thousand Oaks, CA (US)

(73) Assignee: Raytheon Company, Waltham, MA (US)

(*) Notice: Subject to any disclaimer, the term of this patent is extended or adjusted under 35 U.S.C. 154(b) by 390 days.

(21) Appl. No.: 12/462,707

(22) Filed: Aug. 7, 2009

(65) Prior Publication Data

US 2011/0035056 A1 Feb. 10, 2011

(51) Int. Cl.
*G01B 11/26* (2006.01)
(52) U.S. Cl. .................................. 356/139.07
(58) Field of Classification Search .................. 356/614; 700/275, 302; 702/150
See application file for complete search history.

(56) References Cited

U.S. PATENT DOCUMENTS 5,189,492 A * 2/1993 Sollinger et al. .............. 356/622
7,679,728 B2 * 3/2010 Kurokawa .................... 356/4.01

* cited by examiner

*Primary Examiner* — Tarifur Chowdhury
*Assistant Examiner* — Abdullahi Nur
(74) *Attorney, Agent, or Firm* — Pierce Atwood LLP; Joseph M. Maraia

(57) ABSTRACT

A system for measuring deflection in a structure. The novel system includes a detector array for measuring a position of a spot of light and a light source configured to form a spot of light at a position that is dependent on a deflection in the structure. In an illustrative embodiment, the system includes a corner reflector adapted to reflect a beam of light from the light source to the detector array such that a vertical position of the reflected beam is dependent on a total bending in the structure. In an alternate embodiment, the system includes a mirror for reflecting a beam of light from the light source to the detector array such that a vertical position of the reflected beam at the detector array is dependent on a deflection angle between two adjacent panels in the structure.

29 Claims, 5 Drawing Sheets

SYSTEM AND METHOD FOR PRECISE MEASUREMENT OF DEFLECTION

BACKGROUND OF THE INVENTION

1. Field of the Invention

The present invention relates to measurement systems. More specifically, the present invention relates to laser-based measurement systems.

2. Description of the Related Art

An antenna array is typically comprised of a plurality of active antenna elements in which the phases of the signals input to the antenna elements can be adjusted to control the directionality of the array. In order for the antenna to deliver good performance, the phase locations of the antenna elements must be known to a small fraction of a wavelength. However, a very large or lightweight structure cannot easily be held to this precision by mechanical means alone. Large antennas, or small but ultra-lightweight antennas, typically flex or distort more than a tenth of a wavelength.

A large space-based radar antenna, for example, may be over 100 meters in length and include a multitude of panels or segments which are joined at their edges by hinges. This hinging arrangement allows the structure to be folded into a compact arrangement for transportation (such as launch to orbit), but also means that there can be a substantial tilt angle between adjacent panels. Each panel may also be subject to deflections or bending due to differential heating, gravity gradients, residual atmospheric drag, and possibly other causes. These deflections and deviations from the ideal need to be precisely measured in order to properly calibrate the antenna array.

Prior approaches to phase calibration of an antenna array include the use of a remote radio frequency calibration source on earth or in co-orbit with the array. This method, however, can have problems with source availability. Alternatively, the array may be calibrated by using a camera that surveys riseau markings on the structure. This technique, however, has resolution limits for very large structures.

Hence, a need exists in the art for an improved system or method for measuring deflections in large structures that offers greater precision than prior approaches.

SUMMARY OF THE INVENTION

The need in the art is addressed by the system for measuring deflection in a structure of the present invention. The novel system includes a detector array for measuring a position of a spot of light and a light source configured to form a spot of light at a position that is dependent on a deflection in the structure. In an illustrative embodiment, the system uses a corner reflector to reflect a beam of light from the light source to the detector array such that a vertical position of the reflected beam is dependent on a total bending in the structure. In an alternate embodiment, the system uses a mirror to reflect the beam of light from the light source to the detector array such that a vertical position of the reflected beam at the detector array is dependent on a deflection angle between two adjacent panels in the structure.

In a third embodiment, the system is configured to measure vertical displacements at various points across the length of the structure. In this embodiment, the system includes a plurality of detector arrays positioned at various points along the structure, and the light source is adapted to provide a plurality of light beams, each beam focused on a different detector array such that the vertical position of the light beam at each detector array is dependent on a vertical displacement of the structure at the detector array.

BRIEF DESCRIPTION OF THE DRAWINGS

FIG. 1b is a simplified diagram showing a top view of the illustrative measurement system of FIG. 1a.

FIG. 6b is a simplified diagram of a top view of the illustrative measurement system of FIG. 6a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides a novel system and method for measuring deflections in a structure. In general, the novel measurement system of the present teachings includes a laser or other light source for generating a nearly collimated beam of light, a detector array, and an optical arrangement for focusing the light beam to form an optical spot on the detector array such that the location of the spot corresponds with a deflection in the structure. Thus, by measuring the location of the optical spot on the detector array, a measurement of the deflection can be obtained.

The measurement system of the present invention may be adapted to measure several different types of deflection. The following illustrative embodiments show systems configured to obtain various deflection measurements useful for calibrating a large space-based radar antenna. The illustrative antenna includes a multitude of panels that are joined at the edges to form a large (over 100 m in length), nearly flat surface for supporting the antenna elements. As discussed above, various forces can cause deflections and deviations from an ideal, flat surface, resulting in the need to precisely measure these deflections in order to properly calibrate the antenna.

The illustrative embodiments describe configurations for obtaining three different deflection measurements that may have utility in this application: the total bending of a single panel, the angle of deflection between two adjacent panels, and the vertical displacements of the structure at various points along the entire length of the structure. Each scheme employs long "optical lever arms" to achieve very high measurement precision. By incorporating a system designed to measure some or preferably all of these deflection measurements, the phase locations of the antenna elements can be precisely determined, allowing the antenna to be very precisely calibrated and improving overall performance.

Figure 1A:
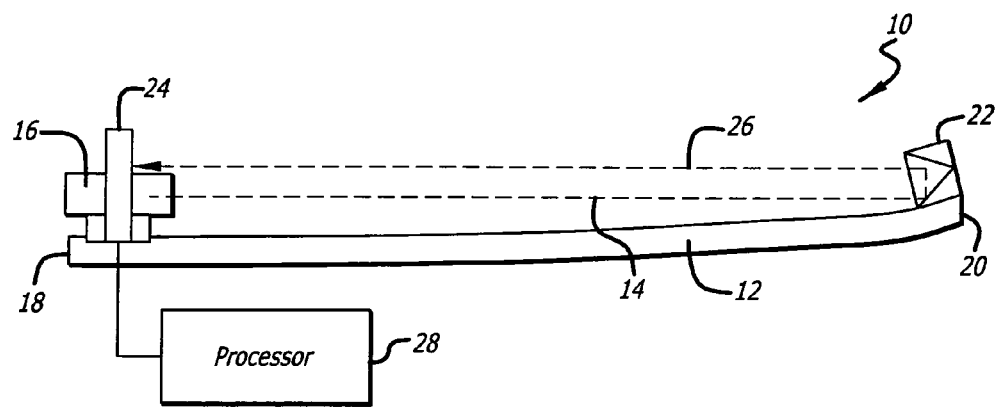
FIG. 1a is a simplified diagram showing a side view of a system for measuring the total bending in a panel designed in accordance with an illustrative embodiment of the present invention.
Figure 1B:
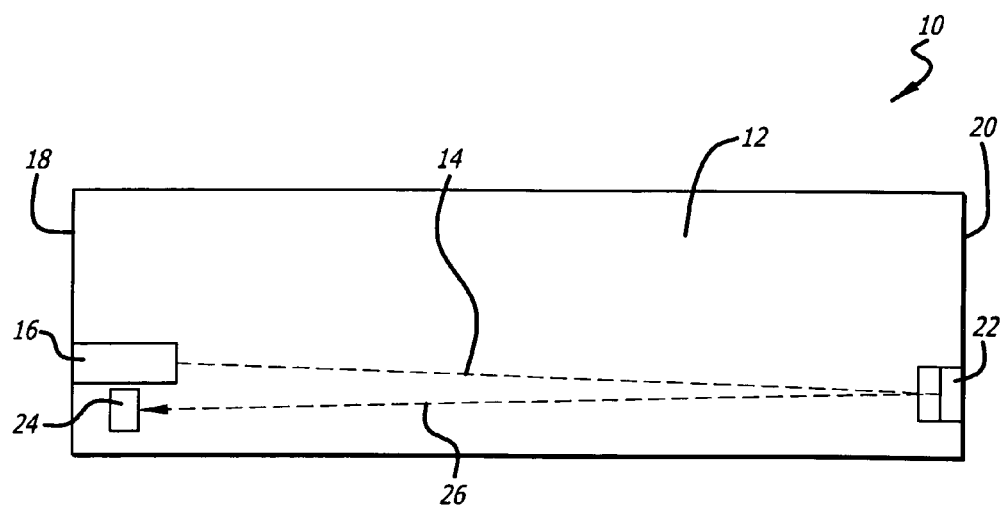

FIGS. 1a and 1b are simplified diagrams showing a side view and a top view, respectively, of a measurement system 10 designed in accordance with an illustrative embodiment of the present invention. In this embodiment, the system 10 is configured to measure the total bending of a single panel 12. In accordance with the present teachings, the total bending of a panel 12 can be measured by sending a light beam 14 from a light source 16 at one edge 18 of the panel 12 to the opposite edge 20 of the panel 12, where a reflector 22 is positioned to retro-reflect the beam 14 back to a detector array 24, which is situated near the light source 16 at the first edge 18 of the panel 12.

In an illustrative embodiment, the light source 16 is a laser that is spatially filtered and collimated so as to provide a diffraction-limited source of light. The light source 16 may include collimation optics having a focus capability that permits focusing of the reflected beam 26 onto the detector array 24 so that a diffraction limited optical spot, or point spread function (PSF), is projected onto the array 24. The beam convergence angle should be small enough that the depth of focus is very large. In a preferred embodiment, the beam 14 is modulated, with synchronous detection by the detector array 24 to help ensure that stray light is rejected. The detector array 24 may also be covered by a narrowband spectrum filter that is matched to the wavelength of the light beam 14, to help reject stray light.

The detector array 24 includes an array of detector elements appropriately spaced so that the location of the projected optical spot (i.e., the position of the center of the spot) can be determined to the desired precision. A PSF can be measured to a small fraction of the spot's diameter, provided that a suitably designed detection instrument 24 is used, such as a staring focal plane array. The primary requirements for ultra-precision location of the PSF's position are that the fixed pattern noise of the focal plane array 24 be corrected and that the focal plane array 24 Nyquist samples the PSF. Nyquist sampling means that the highest spatial frequency of the PSF is sampled at least twice—and preferably more than twice.

Once these two requirements have been met, the general rule of thumb for the position uncertainty of a single measurement is that this uncertainty is roughly equal to the detector spacing divided by the signal-to-noise ratio (SNR). Thus, for example, if the SNR is 10 and the detector spacing is 20 microns, the single measurement spot uncertainty is 20/10=2 microns. By making a sequence of such measurements the effective SNR can be increased and the measurement accuracy will likewise improve. The limit to this process is caused by residual (uncorrected) fixed pattern noise. To some extent even this residual fixed pattern noise can be compensated by carefully plotting the known position of the spot against the mathematically computed position so as to make a correction table. This effectively provides a second level of compensation for the fixed pattern noise.

As shown in FIG. 1a, the measurement system 10 also includes a processor 28 that receives the detector signals from each of the detector elements of the detector array 24 and executes an algorithm designed to calculate a sub-resolution measurement of the position of the focused spot (i.e., the position of the center of the spot) from the detector signals. The simplest such algorithm is a centroid measurement; however other algorithms, such as a correlation matching algorithm could also be used without departing from the scope of the present teachings.

The light source 16, reflector 22, and detector array 24 are arranged so that as the panel 12 bends up or down (the panel 12 is shown bending up in FIG. 1a), the location of the optical spot received by the detector array 24 moves up or down accordingly. In the illustrative embodiment, this is accomplished by positioning the light source 16 and detector array 24 at one end 18 of the panel 12, while a corner reflector 22 is positioned at the opposite end 20 of the panel 12.

The modulated light 14 from the source 16 passes down the length of the panel 12 and is redirected back in the general direction of the source 16 by the reflector 22. The light source 16 is designed to bring the light beam 14 to focus at the detector array 24. The detector array 24 is placed near the light source 16, but not coincident with the light source 16. Thus, the light beam follows a triangular path from the source 16 to the detector array 24, as shown in the top view of FIG. 1b. For this reason, the reflector 22 is preferably a single-fold corner reflector consisting of two reflecting surfaces rather than the more usual three surfaces of a common cube corner reflector.

The detector array 24 is oriented so that the string of detectors lies perpendicular to the surface of the panel 12. As the panel 12 bends, or deflects, the focused spot of the light beam will move up or down the detector array 24 depending on whether the panel 12 deflection is up or down.

Figure 2:
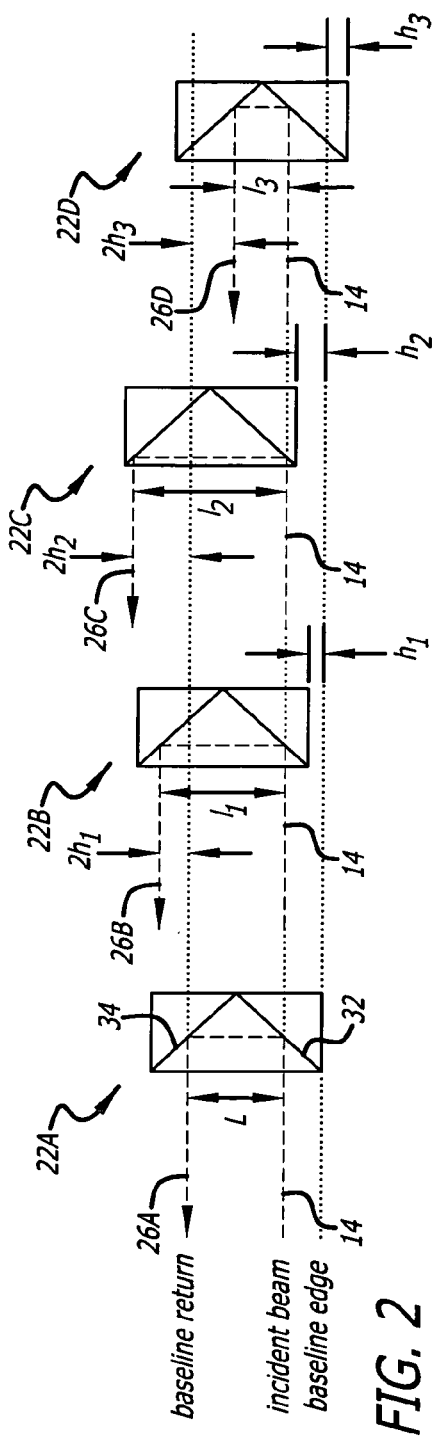
FIG. 2 is a diagram of a corner reflector in four different positions, showing how the position of the reflected beam changes depending on the vertical position of the reflector.

This arrangement works to measure the total bending of the panel 12 because the light 26 reflected by a corner reflector 22 is parallel to the incident light 14. Thus, as the panel 12 bends up or down, causing the corner reflector 22 (which is affixed to the edge 20 of the panel 12) to also move up or down, the reflected beam of light 26 will move up or down by an amount that is proportional to the bending. FIG. 2 illustrates how the vertical motion of the corner reflector 22 affects the vertical displacement of the reflected beam 26.

FIG. 2 is a diagram of a corner reflector 22 in four different positions, showing how the vertical position of the reflected beam 26A, 26B, 26C, and 26D changes depending on the vertical position of the reflector 22A, 22B, 22C, and 22D, respectively.

The first reflector position 22A represents a baseline case in which the panel 12 is flat (i.e., no bending). The incident beam 14 (which is traveling from left to right in FIG. 2, parallel to the surface of the flat panel 12) strikes the first mirror 32 in the corner reflector 22A at a 45° angle and is reflected upward, at an angle of 90 degrees. After traveling a distance L, the beam strikes the second mirror 34 in the corner reflector 22A at a 45° angle and is reflected at an angle of 90 degrees so that the reflected beam 26A is traveling back toward the detector array 24, parallel to the incident beam 14 but displaced vertically by an amount L (where L is the distance traveled between the first and second mirrors 32 and 34 in the reflector 22A). Thus, a corner reflector 22A in the baseline position returns a reflected beam 26A that is a distance L above the incident beam 14.

The second reflector position 22B shows the position of the reflector 22B when the panel 12 is bent upward by a small amount, causing the reflector 22B to move upward by an amount $h_1$ (relative to the baseline position 22A). This causes the incident beam 14 (which is in the same position in all four cases 22A, 22B, 22C, and 22D) to strike the first mirror 32 earlier and therefore closer to the front of the reflector 22B than in the baseline case. The beam is reflected upward and travels a longer distance (relative to the baseline case) before being reflected off the second mirror 34. The reflected beam 26B is therefore displaced by a greater distance. In general, if the vertical displacement of the corner reflector 22 is h, then the relative displacement of the reflected beam 26 (relative to the baseline return 26A) will be 2h. Thus, a corner reflector 22B that is a distance $h_1$ above the baseline position returns a reflected beam 26B that is displaced by a distance $2h_1$ relative to the baseline (i.e., the reflected beam 26B is a distance $l_1=L+2h_1$ above the incident beam 14).

The third reflector position 22C shows the position of the reflector 22C when the panel 12 is bent upward by a larger amount, causing the reflector 22C to move upward by an amount $h_2$ (relative to the baseline position 22A). This causes the reflected beam 26C to be displaced by an amount $2h_2$ relative to the baseline return (i.e., the reflected beam 26C is a distance $l_2=L+2h_2$ above the incident beam 14).

The fourth reflector position 22D shows the position of the reflector 22D when the panel 12 is bent down, causing the reflector 22D to move down by an amount $h_3$ relative to the baseline position 22A. This causes the incident beam 14 to strike the first mirror 32 at a position further from the front of the reflector 22D than in the baseline case, so that it travels a shorter distance (relative to the baseline case) before being reflected off the second mirror 34. The reflected beam 26D is therefore displaced by an amount $2h_3$ below the baseline return (i.e., the reflected beam 26D is a distance $l_3=L-2h_1$ above the incident beam 14).

The vertical displacement h of the corner reflector 22 can therefore be determined by measuring the vertical displacement of the reflected beam 26 relative to the position of the baseline return. Since the vertical displacement of the corner reflector 22 is dependent on the amount of bending in the panel 12, measuring the position of the reflected beam 26 also measures the bending in the panel 12. (Analysis shows that the total path length traveled by the light beam does not vary with the vertical displacement of the corner reflector 22. The point of focus is therefore not affected by this displacement.)

The analysis of FIG. 2 assumed that the bending of the panel 12 resulted in only a vertical displacement of the corner reflector 22. In actuality, the reflector 22 may also rotate with the bending of the panel 12. This reflector rotation will slightly change the total beam displacement as a function of total panel bending, adding a slight second-order variation in how much the reflected beam 26 moves up or down. This is shown in FIG. 3.

Figure 3:
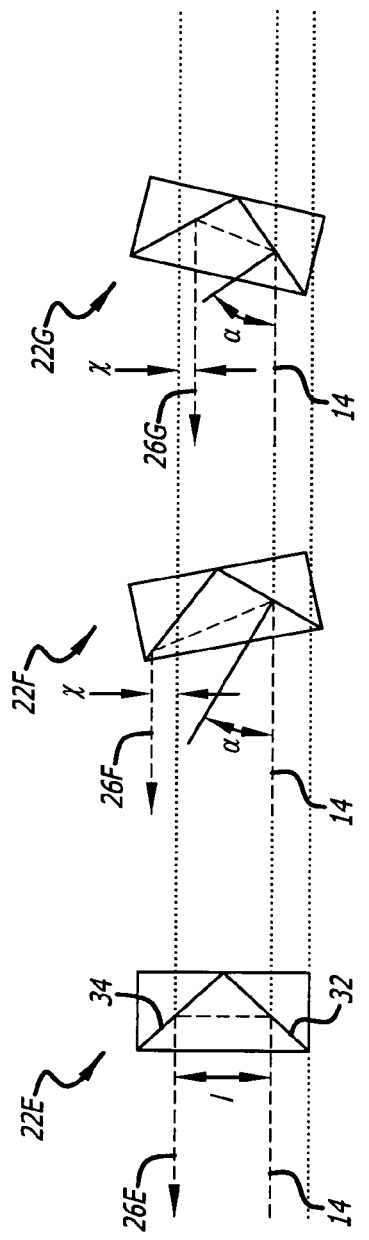
FIG. 3 is a diagram of a corner reflector in three different rotations, showing how the position of the reflected beam changes depending on the rotation of the reflector.

FIG. 3 is a diagram of a corner reflector 22 in three different rotations, showing how the position of the reflected beam 26E, 26F, and 26G changes depending on the rotation of the reflector 22E, 22F, and 22G, respectively (assuming the vertical position of the reflector 22 is the same in all three rotations).

The first reflector rotation 22E represents the case in which the corner reflector 22E is perpendicular to the surface of a flat panel 12 (i.e., with no rotation, as in the examples of FIG. 2). As described above with reference to FIG. 2, a corner reflector 22E with no rotation returns a reflected beam 26E that is a distance l=L+2h above the incident beam 14, where h is the vertical displacement of the corner reflector 22 and L is the distance between the reflected beam 26A and the incident beam 14 for the baseline case (reflector 22A with no vertical displacement and no rotation, as shown in FIG. 2).

The second reflector rotation 22F shows the reflector 22F tilting forward such that the top of the reflector 22F is closer to the light source than the bottom of the reflector 22F (this forward tilt typically occurs when the panel 12 is bent upward). When the reflector 22F is tilted forward, the incident beam 14 no longer strikes the first mirror 32 at a 45° angle. It strikes the first mirror 32 at an incident angle α, which in this case is less than 45°, causing the beam to travel a longer distance between the first and second mirrors 32 and 34 (compared to the no rotation case 22E). The beam reflects off the first mirror 32 at a reflection angle that is equal to the incident angle α and strikes the second mirror 34 at an incident angle of 90°−α. The reflected beam 26F therefore has a reflection angle of 90°−α and, since the second mirror 34 is perpendicular to the first mirror 32, the reflected beam 26F is again parallel to the incident beam 14. However, since the beam travels a longer distance between the first and second mirrors 32 and 34, the reflected beam 26F is displaced by an amount x above the no rotation return 26E, where x is the vertical component of the difference in path length (between the first and second mirrors 32 and 34) compared to the no rotation case 22E. Thus, a forward rotation in the corner reflector 22F returns a reflected beam 26F that is a distance l+x above the incident beam 14, where l is the distance between the reflected beam 26E and the incident beam 14 if the reflector 22E had no rotation.

The third reflector rotation 22G shows the reflector 22G tilting backward such that the top of the reflector 22G is further from the light source than the bottom of the reflector 22G (this backward tilt typically occurs when the panel 12 is bent down). When the reflector 22G is tilted backward, the incident beam 14 strikes the first mirror 32 at an incident angle α that is greater than 45°, causing the beam to travel a shorter distance between the first and second mirrors 32 and 34 (compared to the no rotation case 22E). The reflected beam 26G is therefore displaced by an amount x below the no rotation return 26E, where x is the vertical component of the difference in path length (between the first and second mirrors 32 and 34) compared to the no rotation case 22E. Thus, a backward rotation in the corner reflector 22G returns a reflected beam 26G that is a distance l−x above the incident beam 14.

In general, the displacement in the reflected beam 26 relative to the baseline return (i.e., the reflected beam 22A for a corner reflector 22A with no vertical displacement and no rotation, which occurs when the panel surface is flat with no bending, as shown in FIG. 2) will include both a vertical displacement of 2h due to the vertical displacement h of the reflector 22 and an additional vertical displacement x due to the rotation θ in the reflector 22. The resulting total beam displacement 2h+x is both predictable and measurable for most applications, and may be compensated by laboratory calibration. An estimation for the value of x is described below with reference to FIG. 4.

Figure 4:
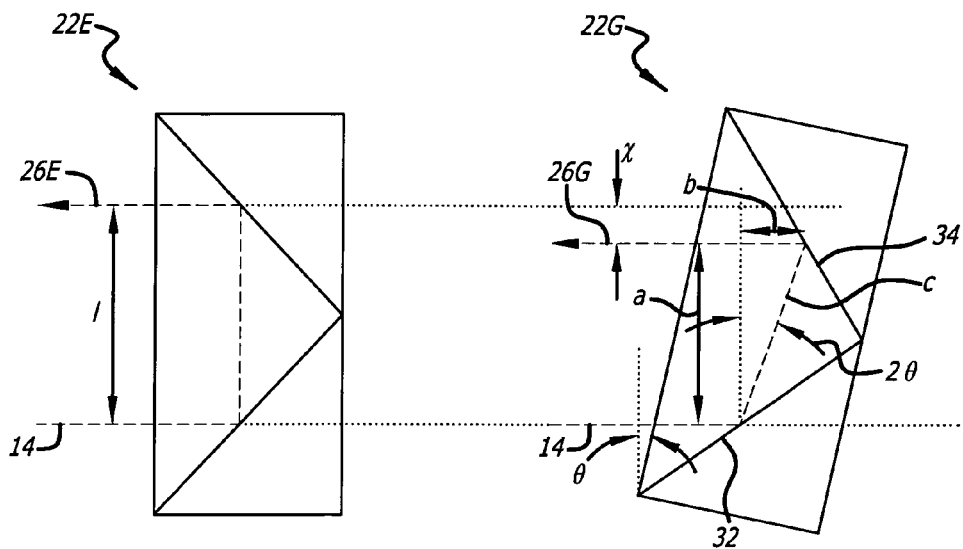
FIG. 4 is a diagram of a corner reflector with no rotation and a corner reflector tilted by an angle θ, showing the geometry for estimating the vertical displacement x in the reflected beam caused by reflector rotation.

FIG. 4 is a diagram of a corner reflector 22E with no rotation and a corner reflector 22G tilted by an angle θ, showing the geometry for estimating the vertical displacement x in the reflected beam 26G caused by reflector rotation. As shown in FIG. 3, for the reflector 22E with no rotation, the reflected beam 26E is a distance l=L−2h above the incident beam 14 for a downward reflector displacement h. For the tilted reflector 22G, x is the vertical displacement between the reflected beam 26G and the no rotation return 26E, a is the vertical distance between the reflected beam 26G and the incident beam 14, c is the path length between the first and second mirrors 32 and 34, and b is the length of the third side of the right triangle formed by segments a and c. If the corner reflector 22G is rotated by an angle θ, then the incoming beam 14 will deviate from its initial first reflection by an angle 2θ. If this angle is sufficiently small, then the vertical displacement x is approximately equal to b. This makes the analysis tractable.

This geometry has the following relationships:

$$a = l - b \tag{1}$$

$$c^2 = a^2 + b^2 = (l-b)^2 + b^2 = l^2 - 2lb + 2b^2 \tag{2}$$

$$c^2 = b^2/\sin^2(2\theta) \tag{3}$$

Substituting Eqn. 3 into Eqn. 2 results in an equation that is quadratic in b. Taking the positive branch of the solution results in, after rationalization of the terms:

$$x \approx b = \frac{\sin(2\theta)\left(\sqrt{1 - \sin^2(2\theta)} - \sin(2\theta)\right)}{1 - 2\sin^2(2\theta)} l \tag{4}$$

As a numerical example, assume a panel length of 2 meters. Suppose the deflection at the far end, due to panel bending, is h=2 cm (down). The corner reflector 22 is therefore displaced down by 2 cm and the reflected return beam 26 will have a displacement from the baseline return (which is a distance L above the incident beam 14) of approximately 2h=4 cm. As a good first approximation, assume the corner reflector 22 is also rotated by θ=(2/100)×180/π=1.15 degrees. Then, using Eqn. 4, the correction to the beam displacement is:

$$x = 3.84 \times 10^{-3\,1\,2} \times (l) = 3.84 \times 10^{-2} \times (L - 2h) \tag{5}$$

Thus, as a numerical example, if h=2 cm and L=10 cm, then the total vertical displacement of the reflected beam 26 would be 2h+x=4.231 cm below the baseline return, so the reflected beam 26 is a distance L−(2h+x)=5.769 cm above the incident beam 14.

In practice, these calculations and estimations may be used to design the measurement system, while laboratory calibration is used to determine a more accurate relationship between the position of the detected beam 26 and the bending of the panel 12. For an antenna application, laboratory calibration can determine how a measured beam position correlates with phase locations for each antenna element on the panel.

Figure 5:
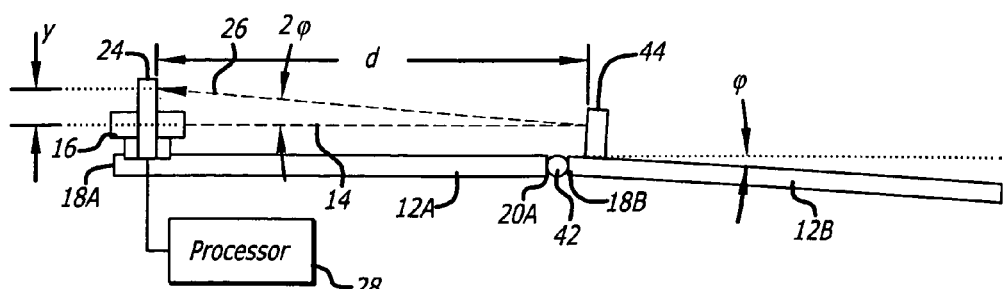
FIG. 5 is a simplified diagram showing a side view of a system for measuring the angle of deflection between two adjacent panels designed in accordance with an illustrative embodiment of the present invention.

FIG. 5 is a simplified diagram showing a side view of a system 40 for measuring the angle of deflection between two adjacent panels designed in accordance with an illustrative embodiment of the present invention. In this embodiment, the system 40 measures the angle between two panels 12A and 12B that are attached to each other by some sort of hinge 42 along the adjacent edges (edge 20A on the first panel 12A and edge 18B on the second panel 12B). This hinging arrangement may be used in a large antenna structure, allowing the structure to be folded into a compact arrangement for transportation (such as launch to orbit). The hinge attachment also means that there can be a substantial tilt angle φ between adjacent panels. The illustrative measurement system 40 shown in FIG. 5 is configured to accurately measure this relative tilt angle φ. Together with the bending measurement, obtained by the illustrative measurement system 10 of FIGS. 1a and 1b as described above, the total local deflection of the adjacent panels can be measured and compared with some ideal.

The system 40 includes a light source 16 positioned at the edge 18A of the first panel 12A furthest from the second panel 12B and configured to focus a light beam 14 onto a detector array 24, which is situated near the light source 16 at the first edge 18A of the first panel 12A. Instead of the corner reflector used in FIGS. 1a and 1b, the system 40 includes a flat mirror 44 mounted on the second panel 12B that reflects the beam 14 from the light source 16 back toward the detector array 24. The mirror 44 is oriented perpendicular to the surface of the second panel 12B, and placed preferably as close as possible to the edge 18B of the panel 12B closest to the hinge 42, in order to minimize effects from any bending in the second panel 12B. The light beam 14 travels the length of the first panel 12A and reflects off of the mirror 44. The reflected beam 26 is then detected by the detector array 24, whose outputs are coupled to a processor 28 designed to measure the position of the reflected beam 26 on the detector array 24.

The light source 16 is essentially the same as in the system 10 of FIGS. 1a and 1b, but the distance to the detector array 24 is somewhat extended because now the beam 14 must reflect off a mirror 44 on the adjacent panel 12B. Thus the focal distance is also somewhat increased compared to the first case. The mirror 44 redirects the beam up or down depending on the tilt of the second panel 12B with respect to the first panel 12A. The angle between the outgoing beam 14 and the reflected beam 26 is twice the hinge angle φ between the first panel 12A and the second panel 12B. The vertical distance y between the detected optical spot and the outgoing beam 14 is therefore given by:

$$y = d \tan(2\phi) \tag{6}$$

where d is the distance between the detector array 24 and the mirror 44.

Thus, by measuring the position y of the reflected beam 26 on the detector array 24, the relative angle φ between panels can be determined (by calculation or, preferably, a look-up table based on laboratory calibration).

Figure 6A:
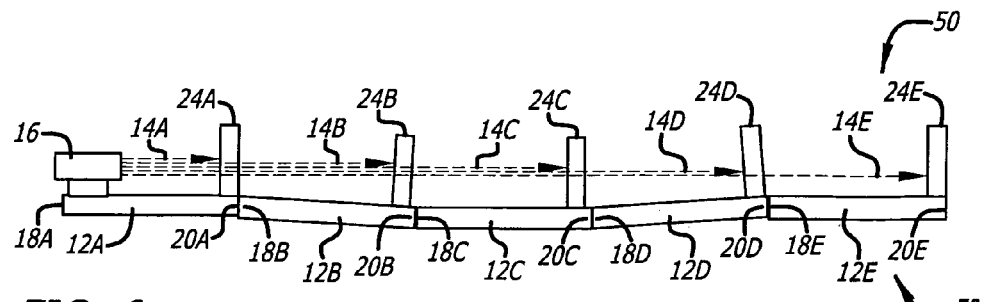
FIG. 6a is a simplified diagram of a side view of a system for measuring deflections down the length of a structure designed in accordance with an illustrative embodiment of the present invention.
Figure 6B:
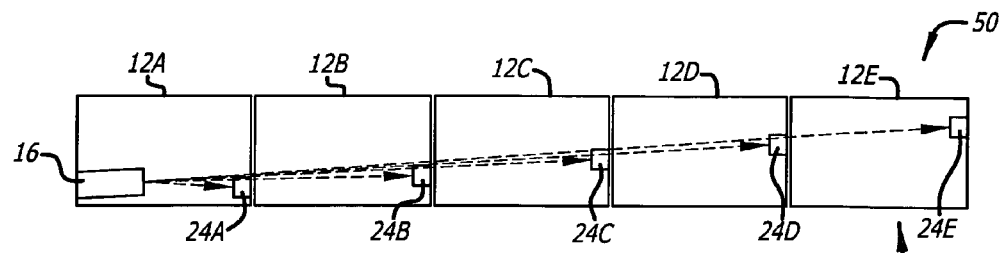

FIGS. 6a and 6b are diagrams of a side view and a top view, respectively, of a system 50 for measuring deflections down the length of a structure 52 designed in accordance with an illustrative embodiment of the present invention. In this embodiment, the structure 52 being measured includes an array of hinged panels 12. The measurement system 50 is configured to measure the vertical displacements of the structure 52 at the end of each panel 12. The same measurement technique can also be used to measure deflections in a more unified structure, such as a truss or beam.

As shown in FIGS. 6a and 6b, the structure 52 includes a plurality of panels 12 connected in an array, each panel 12 including a first edge 18 (closest to the light source 16) and a second edge 20 (furthest from the light source 16). Five panels 12A, 12B, 12C, 12D, and 12E are shown in the figures. The second edge 20A of the first panel 12A is connected to the first edge 18B of the second panel 12B. The second edge 20B of the second panel 12B is connected to the first edge 18C of the third panel 12C. The second edge 20C of the third panel 12C is connected to the first edge 18D of the fourth panel 12D. The second edge 20D of the fourth panel 12D is connected to the first edge 18E of the fourth panel 12E.

The measurement system 50 includes a light source 16 positioned at the first edge 18A of the first panel 12A and a detector array 24A, 24B, 24C, 24D, and 24E placed on each panel 12A, 12B, 12C, 12D, and 12E, respectively. Each detector array 24 is positioned on the edge 20 of the panel 12 furthest from the light source 16. The light source 16 produces separate light beams 14A, 14B, 14C, 14D, and 14E, each of which is brought to focus at its corresponding detector array 24A, 24B, 24C, 24D, and 24E, respectively.

In the illustrative embodiment, a common light source 16 is used to illuminate all the detector arrays 24 by using, for example, a diffraction grating or other device for splitting a single beam into multiple beams. This makes the most compact arrangement, but it does require a special optical design because the various light beams 14A-14E must be brought to focus at different distances. The light source 16 may therefore also include various optical elements such as lenses for focusing the separate beams 14A-14E. An alternate arrangement is to have separate light sources, one for each detector array 24A-24E.

The outputs from each detector array 24A-24E are input to a processor (not shown in FIGS. 6a-6b) adapted to measure the vertical position of the detected optical spot on each detector array 24A-24E (relative to a baseline position, which is the position of the optical spot when the structure 52 is perfectly flat). Thus, the measurement system 50 measures the vertical displacements at the end of each panel 12A-12E, including effects from the combined bending and tilting of each panel 12A-12E, as well as the overall warping of the structure 52.

This configuration 50 can be used to measure the overall warping of a very large structure 52, provided the total warping is sufficiently small so that the light beams 14 do not walk off the ends of the various detector arrays 24. This technique is best used in conjunction with a metering structure or a series of edge actuators, which keep the assembly of panels relatively flat.

The three measurements described above (the total bending in a panel, tilt angle between adjacent panels, and vertical displacements of each panel) can be used together to provide an excellent picture, both local and global, of the shape of the structure. This information can be used to calculate precise phase corrections for each active antenna element of an antenna array supported by the panel structure. Alternatively, or in addition, the measurements may also be used to control the surface figure (i.e. shape) of the panel structure. The technique can be used to create a nearly flat surface that can support a high quality radar antenna.

Figure 7:
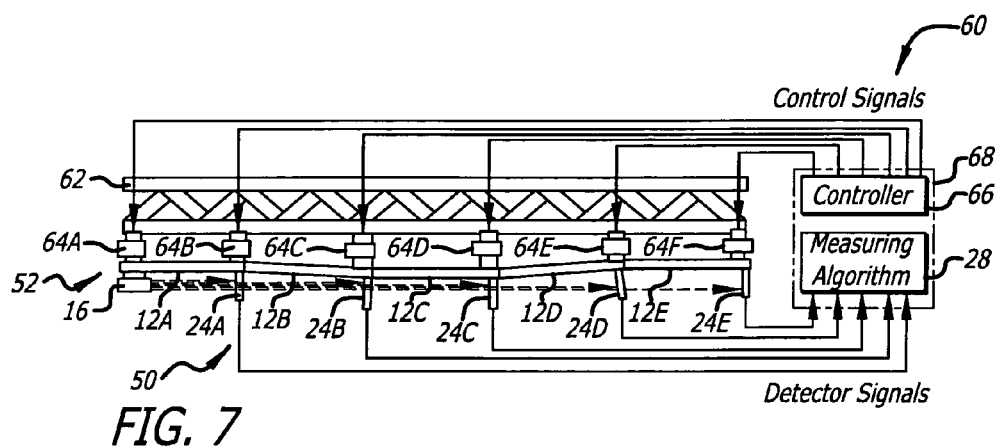
FIG. 7 is a simplified diagram showing a side view of a system for controlling the surface shape of a structure designed in accordance with an illustrative embodiment of the present invention.

FIG. 7 is a simplified diagram showing a side view of a system 60 for controlling the surface shape of a structure 52 designed in accordance with an illustrative embodiment of the present invention. In this embodiment, the system 60 includes a metered truss structure 62 to which the paneled structure 52 is affixed via several actuators 64A-64F, a measurement system 50 for measuring vertical displacements at the end of each panel 12 of the structure 52 (as described above with reference to FIGS. 6a-6b), and a controller 66. The controller 66 generates control signals for the actuators 64A-64F based on the displacement measurements obtained by the measurement system 50. Thus, for example, if the detector array 24B on a particular panel 12B measures a vertical displacement −y, the controller 66 generates a control signal to the actuator 64C positioned near the detector array 24B such that the panel 12B is raised by an amount +y. The control system 60 can therefore be used to create a nearly flat surface (or some other desired shape). Additional measurements (such as those obtained by the measurement systems described above) can then be used to "fine tune" the illustrative antenna system through phase calibrations. In an illustrative embodiment, the measuring algorithm 28 of the measurement system 50 and the controller 66 may be implemented by a common processor 68.

The back support truss structure 62 does not have to be perfect, or perfectly rigid. Any flexure in the support truss 62 can be compensated by adjusting the various actuators 64—provided the dynamic range of the actuators 64 is substantially greater than any possible flexing of the support truss 62.

In space applications, a weak gravity gradient is typically the dominant perturbation. Residual atmospheric drag may also contribute a small bending force. However, there typically is not a strong gravitational acceleration which would require substantial support against collapse of the structure. Torques and forces required to maintain precise alignment will typically be small. Consequently, a somewhat different metering solution is possible. This solution uses the array of panels themselves as the metering structure. This embodiment is shown in FIG. 8.

Figure 8:
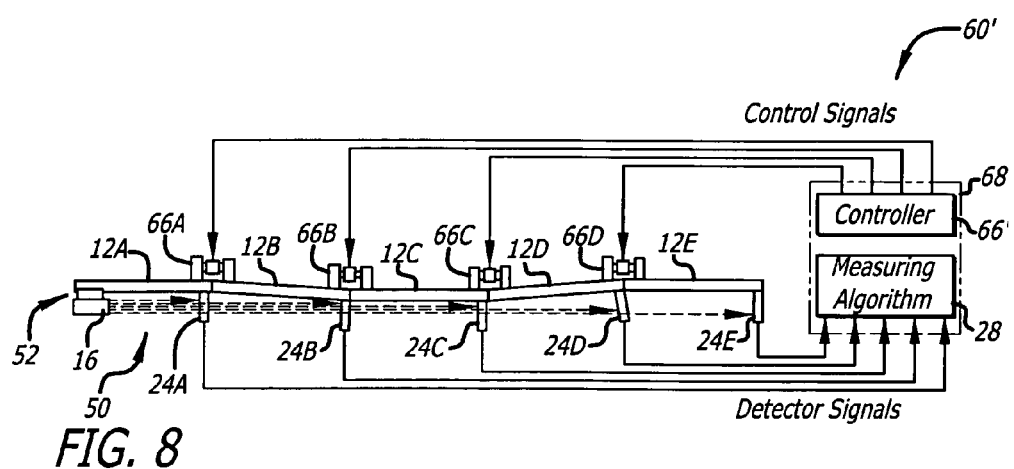
FIG. 8 is a simplified diagram showing a side view of an alternate system for controlling the surface shape of a structure designed in accordance with an illustrative embodiment of the present invention.

FIG. 8 is a simplified diagram showing a side view of an alternate system 60' for controlling the surface shape of a structure 52 designed in accordance with an illustrative embodiment of the present invention. In this embodiment, the paneled structure 52 is not supported by an additional metering structure 62 as in FIG. 7. Instead, alignment of the panels 12A-12E are adjusted by edge actuators 66A-66D placed at the interfaces between adjacent panels. The edge actuators 66A-66D are adapted to control the alignment of a panel 12 relative to an adjacent panel 12. A controller 66' generates control signals for the actuators 66A-66D from the measurements obtained by the measurement system 50.

A large structure may be subject to large deflections. Potential causes include differential heating, gravity gradients, residual atmospheric drag, and possibly other causes. As a result, the suite of alignment sensors should have sufficient dynamic range to bring a badly warped structure into precise alignment. The measurement systems of the present teachings have inherently large dynamic range. The precision of measurement is primarily a function of the SNR. This precision provides the low end of the dynamic range scale. The upper end can be provided by increasing the length of the detector arrays.

An alternative is to employ sensors of varying dynamic range. Thus, coarse measurement sensors can be used to bring the structure into approximate alignment while fine sensors finish the job of providing the desired alignment precision.

The greater the path length traveled by the light beam between the light source 16 and the detector array 24, the larger the detected optical spot due to diffraction effects. This should be taken into consideration when designing the detector array 24 (e.g., the size of the detector elements). The following are numerical examples analyzing beam diffraction for the measurement systems of the present invention. Two cases are presented. In the first case, the measurement range is relatively short so the light source is expanded through a small aperture. In the second case, the measurement range is long so the aperture is significantly larger.

The first case applies to observation of both the corner reflector (embodiment shown in FIGS. 1a-1b) and the simple reflective mirror (embodiment shown in FIG. 5). Assume that the aperture of the light source is D=1 cm and that the panels are two meters in length so that the round trip distance (from the light source to the reflector and back to the detector array) is R=4 meters. Also assume that the wavelength λ of the light beam is $6 \times 10^{-7}$ meters. The approximate diameter δw of the focused diffraction spot is therefore given by:

$$\delta w = 1.22 \lambda R/D = 1.22 \times (6 \times 10^{-7}) \times 4/0/01 = 3 \times 10^{-4} \, \text{m} \quad [7]$$

For Nyquist sampling, the pixel (i.e. detector) size should be less than half this, or about 150 microns, max. For example, a focal plane array with 350 detector elements of size 150 microns would span 5.25 cm, which would be the maximum of the dynamic range for that array. Panel deflections causing beam displacements of up to 5 centimeters could therefore be very accurately measured.

The SNR for this example application will likely be very large. However, assuming a conservative SNR of only 10, then the single measurement position error would be 150/10=15 microns. If the antenna array extends out to 50 panels, the error buildup will be a random walk. The mean position error at the far end of the multi-panel array would be $\sqrt{50} \times 15 = 106$ microns. This is a very small error for microwave applications.

The complementary approach would be to place detector arrays on each panel and use light source(s) on the base panel to project focused spots on each of these detector arrays (embodiment shown in FIGS. 6a-6b). This approach has greatest utility where the shape of the structure is controlled by actuators, as shown in FIGS. 7-8. Actuator control ensures that the bending of the measured structure does not become so large that there is a significant dynamic range problem. Moreover, with actuators controlling each panel, the controlled surface will remain essentially flat over its entire extend. If this surface contains an array of antenna elements, this assured flatness minimizes the need for compensating phase adjustments as the electronically scanned microwave beam is scanned over a substantial angle.

In order to get good measurement precision out to the far reaches of the structure, the aperture size of the light source should be increased. Suppose the size of the light source aperture is D=10 cm (4 inches), then the size of the diffraction spot δw at the far end of a 100 meter structure will be:

$$\delta w = 1.22 \lambda R/D = 1.22 \times (6 \times 10^{-7}) \times 100/0.1 = 7.3 \times 10^{-4} \text{ m} \quad [8]$$

An SNR of 10 (a very conservative assumption) would give a measurement error of $7.3 \times 10^{-5}$ m. This small error should be plenty good enough to support a sub-millimeter wavelength antenna. Thus, this measuring technique could potentially be used for much more advanced systems than are currently being developed.

With a light source aperture D of only 1 cm, as with the first case, the diffraction spot δw at 100 meters would be:

$$\delta w = 1.22 \lambda R/D = 1.22 \times (6 \times 10^{-7}) \times 100/0.01 = 7.3 \times 10^{-3} = 0.73 \text{ cm} \quad [9]$$

This would be a very large spot. It compares in size to the aperture of the light source. Any reasonable detector array will therefore greatly over sample the point spread function. This has the merit that the impact of fixed pattern noise will be substantially reduced. However, with this oversized spot, one must be careful to watch for aliasing effects, as these could substantially reduce the measurement accuracy.

With an SNR of 10, the measurement error would be substantially less than $7.3 \times 10^{-4}/2$ m. This is less than a millimeter. For an x-band radar with a wavelength of 0.03 m, this measurement system could hold the aperture accuracy to $0.03/(2 \times 7.3 \times 10^{-4}) = 1/80$th of a wavelength.

The present invention thus provides a novel system for precisely measuring deflections in a structure by using a focused laser beam in conjunction with a properly designed detector array in an optical arrangement configured such that the position of the focused optical spot on the detector array corresponds with the amount of deflection in the structure. Various configurations are possible for measuring different types of deflection, such as the total bending in a panel, the tilt angle between adjacent panels, and the vertical displacements across the length of a structure. Sub-resolution tracking algorithms should make it possible to detect beam displacements that are a small fraction of the focused spot diameter. In many cases, the technique should be able to reliably measure beam displacements of a few microns over tens to hundreds of meters of structure length.

Note that while the illustrative embodiments and analyses have been described for measuring deflections in only one dimension, the invention may also be adapted to measure deflections in two dimensions without departing from the scope of the present teachings.

Thus, the present invention has been described herein with reference to a particular embodiment for a particular application. Those having ordinary skill in the art and access to the present teachings will recognize additional modifications, applications and embodiments within the scope thereof. For example, while the illustrative embodiments have been described with reference to particular deflection measurements useful for calibrating a large antenna, the invention may also be applied to other applications and for measuring other types of deflections without departing from the scope of the present teachings.

It is therefore intended by the appended claims to cover any and all such applications, modifications and embodiments within the scope of the present invention.

Accordingly,

What is claimed is:

1. A system for measuring deflection in a structure, comprising:
    first means for measuring a position of a spot of light; and
    second means for forming said spot of light at a position that is dependent on a deflection in said structure,
    wherein said first means includes a detector array oriented perpendicular to a surface of said structure,
    wherein said first means further includes a processor adapted to receive detector signals from said detector array and in accordance therewith calculate said position of said spot,
    wherein said second means includes a light source for generating a substantially collimated beam of light focused on said detector array,
    wherein said light source is positioned at a first end of said structure,
    wherein said system is configured to measure a total amount of bending in said structure,
    wherein said detector array is positioned next to said light source at said first end of said structure, and
    wherein said second means further includes third means for reflecting said beam of light from said light source to said detector array such that a vertical position of the reflected beam at said detector array is dependent on a total bending in said structure.

2. The system of claim 1, wherein said third means includes a corner reflector.

3. The system of claim 2, wherein said reflector is positioned at a second end of said structure opposite said first end.

4. A system for measuring deflection in a structure comprising:
    first means for measuring a position of a spot of light; and
    second means for forming said spot of light at a position that is dependent on a deflection in said structure,
    wherein said first means includes a detector array oriented perpendicular to a surface of said structure, wherein said first means further includes a processor adapted to receive detector signals from said detector array and in accordance therewith calculate said position of said spot, wherein said second means includes a light source for generating a substantially collimated beam of light focused on said detector array, and wherein said structure includes first and second panels joined by a hinge.

5. The system of claim 4, wherein said light source is a laser.

6. The system of claim 4, wherein said system is configured to measure a total amount of bending in said structure.

7. The system of claim 6, wherein said light source is positioned at a first end of said structure.

8. The system of claim 7, wherein said detector array is positioned next to said light source at said first end of said structure.

9. The system of claim 4, wherein said system is configured to measure a deflection angle between said first and second panels.

10. The system of claim 9, wherein said light source is mounted on said first panel.

11. The system of claim 10, wherein said light source is positioned at a first end of said first panel furthest from said second panel.

12. The system of claim 11, wherein said detector array is positioned next to said light source at said first end of said first panel.

13. The system of claim 12, wherein said second means further includes a mirror for reflecting said beam of light from said light source to said detector array such that a vertical position of the reflected beam at said detector array is dependent on said deflection angle between said first and second panels.

14. The system of claim 13, wherein said mirror is mounted on said second panel.

15. The system of claim 14, wherein said mirror is positioned at a first end of said second panel closest to said hinge.

16. The system of claim 4, wherein said system is configured to measure vertical displacements at a plurality of points along said structure.

17. The system of claim 16, wherein said second means includes a plurality of detector arrays positioned at various points along said structure.

18. A system for measuring deflection in a structure comprising:
first means for measuring a position of a spot of light; and
second means for forming said spot of light at a position that is dependent on a deflection in said structure,
wherein said first means includes a detector array oriented perpendicular to a surface of said structure,
wherein said first means further includes a processor adapted to receive detector signals from said detector array and in accordance therewith calculate said position of said spot,
wherein said second means includes a light source for generating a substantially collimated beam of light focused on said detector array,
wherein said system is configured to measure vertical displacements at a plurality of points along said structure,
wherein said second means includes a plurality of detector arrays positioned at various points along said structure, and
wherein said light source is adapted to provide a plurality of light beams, each beam focused on a different detector array such that the vertical position of said light beam at each detector array is dependent on a vertical displacement of said structure at said detector array.

19. The system of claim 18, wherein said structure includes a plurality of panels connected in an array.

20. The system of claim 19, wherein said light source is positioned at a first end of a first panel.

21. The system of claim 20, wherein a detector array is mounted on each panel.

22. The system of claim 21, wherein each detector array is positioned on each panel at an end furthest from said light source.

23. A system for controlling a surface shape of a structure comprising:
a plurality of actuators adapted to adjust deflections in said structure;
a plurality of detector arrays mounted on said structure;
a light source adapted to focus a light beam on each detector array such that a spot of light is projected on each detector array at a position that is dependent on a deflection in said structure at said detector array;
a processor adapted to receive detector signals from said detector arrays and in accordance therewith measure the position of each spot; and
a controller adapted to receive said position measurements and in accordance therewith generate a plurality of control signals for controlling said actuators to form a desired surface shape in said structure.

24. The system of claim 23, wherein said structure includes a plurality of panels connected in an array.

25. The system of claim 24, wherein said light source is positioned at a first end of a first panel.

26. The system of claim 25, wherein a detector array is mounted on each panel at an end furthest from said light source.

27. The system of claim 26, wherein said actuators are edge actuators positioned at interfaces between adjacent panels and adapted to adjust a relative alignment between said adjacent panels.

28. The system of claim 26, wherein said structure is mounted to a metering truss by said actuators.

29. A method for measuring deflection in a structure, comprising:
adjusting deflections in said structure using a plurality of actuators;
mounting a plurality of detector arrays on said structure;
forming, using a light source, a focused spot of light on each detector array at a position that is dependent on a deflection in said structure at said detector array;
receiving, using a processor, detector signals from each detector array;
measuring, using the processor, said position of said spot of light at said detector array in accordance with the received detector signals; and
using a controller adapted to receive said position measurements and in accordance therewith, generating a plurality of control signals for controlling said actuators to form a desired surface shape in said structure.

* * * * *